United States Patent
Delp et al.

(10) Patent No.: US 10,471,904 B2
(45) Date of Patent: Nov. 12, 2019

(54) SYSTEMS AND METHODS FOR ADJUSTING THE POSITION OF SENSORS OF AN AUTOMATED VEHICLE

(71) Applicant: TOYOTA MOTOR ENGINEERING & MANUFACTURING NORTH AMERICA, INC., Erlanger, KY (US)

(72) Inventors: Michael J. Delp, Ann Arbor, MI (US); Danil V. Prokhorov, Canton, MI (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 215 days.

(21) Appl. No.: 15/231,099

(22) Filed: Aug. 8, 2016

(65) Prior Publication Data

US 2018/0039273 A1 Feb. 8, 2018

(51) Int. Cl.
*B60R 11/04* (2006.01)
*G05D 1/00* (2006.01)
*B60R 11/00* (2006.01)
*B60W 50/14* (2012.01)
*G01S 7/481* (2006.01)

(Continued)

(52) U.S. Cl.
CPC .............. *B60R 11/04* (2013.01); *B60R 11/00* (2013.01); *B60W 50/14* (2013.01); *G01S 7/02* (2013.01); *G01S 7/4813* (2013.01); *G01S 13/931* (2013.01); *G05D 1/0094* (2013.01); *B60R 2011/0092* (2013.01); *B60R 2300/101* (2013.01); *G01S 2013/9332* (2013.01); *G01S 2013/9364* (2013.01); *G01S 2013/9367* (2013.01)

(58) Field of Classification Search
CPC .... G05D 1/0094; G05D 1/021; G05D 1/0231; G05D 1/0246; G05D 1/0257; B60R 11/00; B60R 11/04; B60R 2300/101; G01S 7/4813
See application file for complete search history.

(56) References Cited

U.S. PATENT DOCUMENTS 5,448,319 A * 9/1995 Iuzawa .................... B60R 1/00
396/351
6,151,539 A 11/2000 Bergholz et al.
(Continued)

FOREIGN PATENT DOCUMENTS

CN 102555934 A * 7/2012
DE 3317003 A1 * 11/1984
(Continued)

OTHER PUBLICATIONS

EPO machine translation of WO 2015/062602 (original WO document published May 7, 2015) (Year: 2015).*

*Primary Examiner* — Behrang Badii
*Assistant Examiner* — David A Testardi
(74) *Attorney, Agent, or Firm* — Oblon, McClelland, Maier & Neustadt, L.L.P.

(57) ABSTRACT

A system for adjusting the position of one or more sensors of an autonomous vehicle includes a plurality of sensor arms, a plurality of sensor manipulators attached to each of the plurality of sensor arms. The system can be configured to receive output from the one or more sensors, and determine if an occlusion zone is detected. Based on the objects creating the occlusion zone, the sensors can be adjusted to decrease the size of the occlusion zone.

13 Claims, 8 Drawing Sheets

(51) Int. Cl.
*G01S 7/02* (2006.01)
*G01S 13/93* (2006.01)

(56) References Cited

U.S. PATENT DOCUMENTS

| | | | |
|---|---|---|---|
| 6,384,741 B1* | 5/2002 | O'Leary, Sr. | B60R 1/00 340/905 |
| 6,595,704 B2* | 7/2003 | Ambrose | G03B 17/00 348/143 |
| 6,911,997 B1* | 6/2005 | Okamoto | B60R 1/00 348/148 |
| 7,899,616 B2 | 3/2011 | Breed | |
| 8,036,424 B2* | 10/2011 | Ishikawa | G06K 9/00805 382/103 |
| 8,589,014 B2 | 11/2013 | Fairfield et al. | |
| 9,176,500 B1 | 11/2015 | Teller et al. | |
| 9,336,436 B1* | 5/2016 | Dowdall | G08G 1/166 |
| 9,632,504 B1* | 4/2017 | Watts | G05D 1/0231 |
| 2002/0146249 A1* | 10/2002 | Ambrose | G03B 17/00 396/428 |
| 2004/0085444 A1* | 5/2004 | Ho | H04N 7/185 348/143 |
| 2005/0146160 A1* | 7/2005 | Beauchamp | B60J 5/06 296/155 |
| 2005/0205789 A1* | 9/2005 | Caron | B60R 11/04 250/353 |
| 2008/0059015 A1 | 3/2008 | Whittaker et al. | |
| 2009/0230709 A1* | 9/2009 | Beauchamp | B60R 11/04 296/1.04 |
| 2012/0263450 A1* | 10/2012 | Totani | B60R 11/04 396/428 |
| 2013/0151058 A1 | 6/2013 | Zagorski et al. | |
| 2013/0197736 A1* | 8/2013 | Zhu | G05D 1/0088 701/26 |
| 2013/0245877 A1* | 9/2013 | Ferguson | B60R 1/00 701/23 |
| 2014/0172290 A1* | 6/2014 | Prokhorov | G01C 21/3602 701/408 |
| 2014/0218530 A1* | 8/2014 | Sinclair | G08G 1/00 348/148 |
| 2014/0222276 A1* | 8/2014 | Bosscher | G05D 1/021 701/23 |
| 2015/0035662 A1* | 2/2015 | Bowers | B60Q 9/008 340/436 |
| 2015/0035687 A1* | 2/2015 | Bowers | G08G 1/166 340/933 |
| 2015/0039218 A1* | 2/2015 | Bowers | B60W 30/0956 701/301 |
| 2015/0175088 A1* | 6/2015 | Chang | B60R 11/04 348/148 |
| 2015/0329111 A1* | 11/2015 | Prokhorov | B60W 10/18 701/41 |
| 2015/0332114 A1* | 11/2015 | Springer | G06K 9/4604 348/148 |
| 2015/0353083 A1 | 12/2015 | Hasberg et al. | |
| 2016/0065796 A1* | 3/2016 | Happy | B60R 1/006 348/376 |
| 2016/0082912 A1 | 3/2016 | Yoon | |
| 2016/0140403 A1* | 5/2016 | Nagata | B60R 1/06 382/104 |
| 2016/0282468 A1* | 9/2016 | Gruver | G01S 17/93 |
| 2017/0115387 A1* | 4/2017 | Luders | G01S 13/865 |
| 2018/0001474 A1* | 1/2018 | Sinyavskiy | B25J 5/007 |
| 2018/0003529 A1* | 1/2018 | Ko | B60R 11/02 |
| 2018/0004170 A1* | 1/2018 | Ko | H02K 11/21 |

FOREIGN PATENT DOCUMENTS

| | | | |
|---|---|---|---|
| DE | 3900667 A1 * | 7/1990 | B60R 1/00 |
| DE | 102014006961 A1 * | 11/2015 | |
| JP | 2008162308 A * | 7/2008 | |
| WO | WO-2015/062602 A1 * | 5/2015 | |
| WO | WO-2016/208786 A1 * | 12/2016 | |

* cited by examiner

SYSTEMS AND METHODS FOR ADJUSTING THE POSITION OF SENSORS OF AN AUTOMATED VEHICLE

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Elevated sensor systems in a highly automated or autonomous vehicle assist in increasing a detection range. However, autonomous vehicles, including those that implement an elevated sensor system, typically have limited or no verticle visibility down the sides of the autonomous vehicle.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In one aspect, a system for adjusting the position of one or more sensors of an autonomous vehicle includes a plurality of sensor arms, a plurality of sensor manipulators attached to each of the plurality of sensor arms, a plurality of sensor sections, the sensor sections attached to each of the plurality of sensor manipulators, and processing circuitry configured to receive output from the one or more sensors, determine if an occlusion zone is detected, receive information corresponding to one or more objects creating the occlusion zone in response to the detection of the occlusion zone, and adjust a position of the one or more sensors based on the information corresponding to the one or more objects creating the occlusion zone to decrease the size of the occlusion zone.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "front," "side," "height," "width," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

Figure 1A:
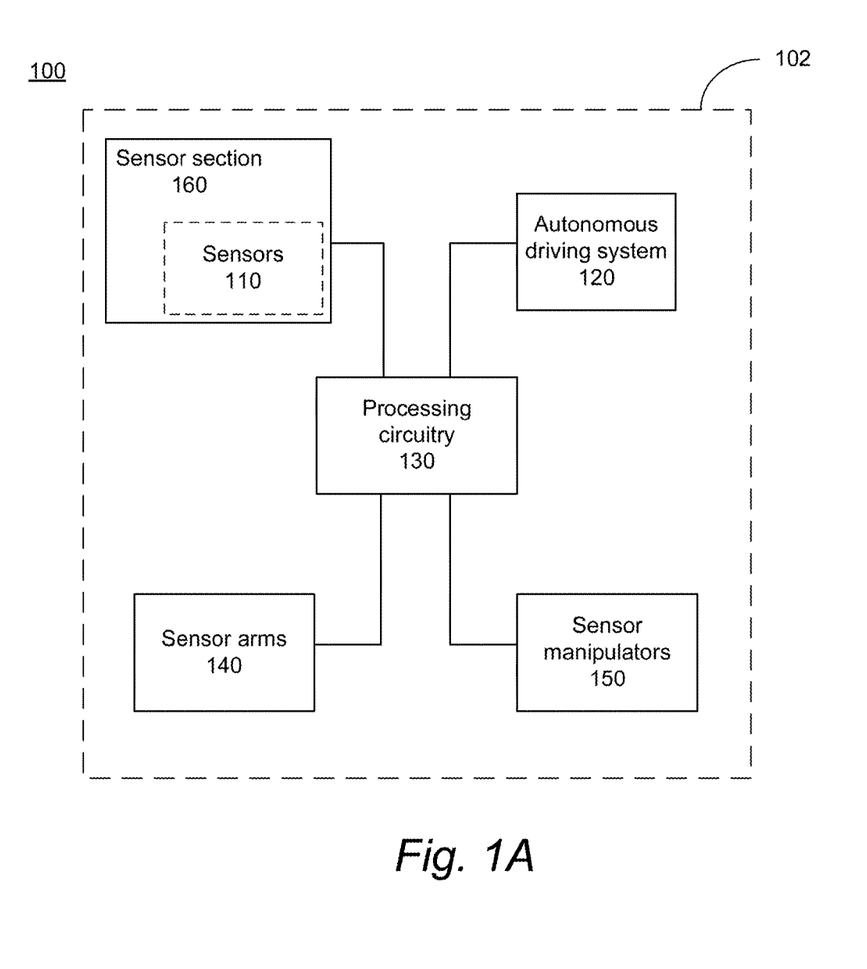
FIG. 1A is a block diagram of a system for adjusting the position of one or more sensors of an autonomous vehicle according to one or more embodiments of the disclosed subject matter.

FIG. 1A is a block diagram of a system for adjusting the position of one or more sensors of an autonomous vehicle (herein referred to as system 100) according to one or more embodiments of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

System 100 can include a sensor section 160, the sensor section 160 including one or more sensors 110, an autonomous driving system 120, processing circuitry 130 (which can include internal and/or external memory), sensor arms 140, and sensor manipulators 150. Each arm or manipulator can have one or more links connected at one or more joints analogous to a multi-joint robotic arm as would be known by one of ordinary skill in the art. In one or more embodiments, the sensor section 160, the sensors 110, the autonomous driving system 120, the processing circuitry 130, the sensor arms 140, and the sensor manipulators 150 can be implemented in a stand-alone apparatus 102. In one aspect, the stand-alone apparatus can be an autonomous vehicle or a highly automated vehicle, for instance.

Generally speaking, system 100 can adjust the position of the sensors 110 to provide a wide stereo baseline and increase the detection range of the sensors. The wide stereo baseline can correspond to an increased visibility of the sensors of the autonomous vehicle. The detection range of the sensors can be wider, as well as farther, due to the wide stereo baseline. Based on signals received from the sensors 110, sensor arms 140 and sensor manipulators 150 can adjust to improve the position of the sensors 110 to assist in the operation of the autonomous vehicle 102.

More specifically, based on various received signals from the sensors 110, the system 100 can detect one or more occlusion zones. The occlusion zones can be caused by one or more objects (e.g., human, animal, inanimate object, etc.) in the line of sight of the sensors 110. When an occlusion zone is detected, the sensor arms 140 and/or the sensor manipulators 150 can adjust the position of the sensors 110 to decrease the size of the occlusion zone. In one aspect, an occlusion zone can be detected via a LIDAR scanning sensor by making a polar grid and marking the area in each grid direction up until the first LIDAR scan distance return as free and beyond each as occluded.

For operation of the autonomous vehicle 102, the processing circuitry 130 can be in communication with the autonomous driving system 120. The processing circuitry 130 receives information from the sensors 110 and transmits the commands to the autonomous driving system 120 for operation of autonomous vehicle 102 based on the information received from the sensors 110. The autonomous driving system 120 includes a vehicle braking system, a vehicle propulsion system, a vehicle steering system, and the like that can operate the autonomous vehicle 102 in response to the data collected by the sensors 110.

The processor or processing circuitry 130 can carry out instructions to perform or cause perfoiuiance of various functions, operations, steps or processes of the system 100. The processor/processing circuitry 130 can be configured to store information in memory, operate the system 100, control the autonomous driving system 120, control the sensor arms 140, control the sensor manipulators 150, receive and send information in the form of signal(s) from the sensors 110, and the like.

Sensor section 160 can represent one or more sensor sections 160. The sensor section 160 can include one or more sensors 110. In one aspect, the sensor section 160 can be representative of one or more sensors 110 directly communicably coupled to the processing circuitry 130 by electrical wiring, for example. In another aspect, the sensor section 160 can be configured to receive one or more sensors 110 as attachments, communicably coupling the one or more sensors 110 to the processing circuitry via the sensor section 160. The sensors 110 may be removable from the sensor section 160 for repair or replacement. The sensor section 160 can be communicably coupled to the processing circuitry 130, such that the sensors 110 can transmit data to the processing circuitry 130 via electrical wiring, for example. Each sensor section 160 can be attached to a corresponding sensor manipulator 150.

The sensor manipulators 150 can represent one or more sensor manipulators 150, each communicably coupled to the processing circuitry 130. Each sensor manipulator 150 can receive signals from the processing circuitry 130 to adjust the position of the corresponding sensor section 160. The adjustment of the sensor section 160 via the sensor manipulator 150 includes one or more of raising, lowering, rotating axially, extending, retracting, and swiveling. The sensor manipulator 150, attached to a corresponding sensor arm 140, can telescopically extend and retract. The sensor manipulator 150 can be attached to the corresponding sensor arm 140 by various connection mechanisms (e.g., a ball and socket connection), as would be known by one of ordinary skill in the art, to allow a range of motion including raising and lowering the sensor section 160 relative to the connection point of the sensor manipulator 150 with corresponding sensor arm 140, rotating the sensor section 160 about the axis of the sensor manipulator 150, swiveling the sensor section 160 about an axis of the sensor arm 140 to which the sensor manipulator 150 is connected, and the like.

The sensor arms 140 can represent one or more sensor arms 140, each communicably coupled to the processing circuitry 130. Each sensor arm 140 can receive signals from the processing circuitry 130 to adjust the position of the corresponding sensor section 160. The adjustment of the sensor section 160 via the sensor arm 140 includes one or more of raising, lowering, rotating axially, extending, retracting, and swiveling. The sensor arm 140, attached to the autonomous vehicle 102, can telescopically extend and retract. The sensor arm 140 can be attached to the autonomous vehicle 102 by various connection mechanisms (e.g., ball and joint connection), as would be known by one or ordinary skill in the art, to allow a range of motion including raising and lowering the sensor section 160 relative to the connection point of the sensor arm 140 with autonomous vehicle 102, rotating the sensor section 160 about an axis of the sensor arm 140, swiveling the sensor section 160 about an axis at least substantially perpendicular to the plane on which the autonomous vehicle is traveling to swivel the sensor section 160 toward the front of the autonomous vehicle 102 or to swivel the sensor section 160 toward the back of the autonomous vehicle 102, and the like.

In other words, each sensor arm 140 and corresponding sensor manipulator 150 adjusts the position of the corresponding sensor section 160, and therefore the one or more sensors 110, to improve visibility for the one or more sensors 110, increase the range of the one or more sensors 110, and the like.

Figure 1B:
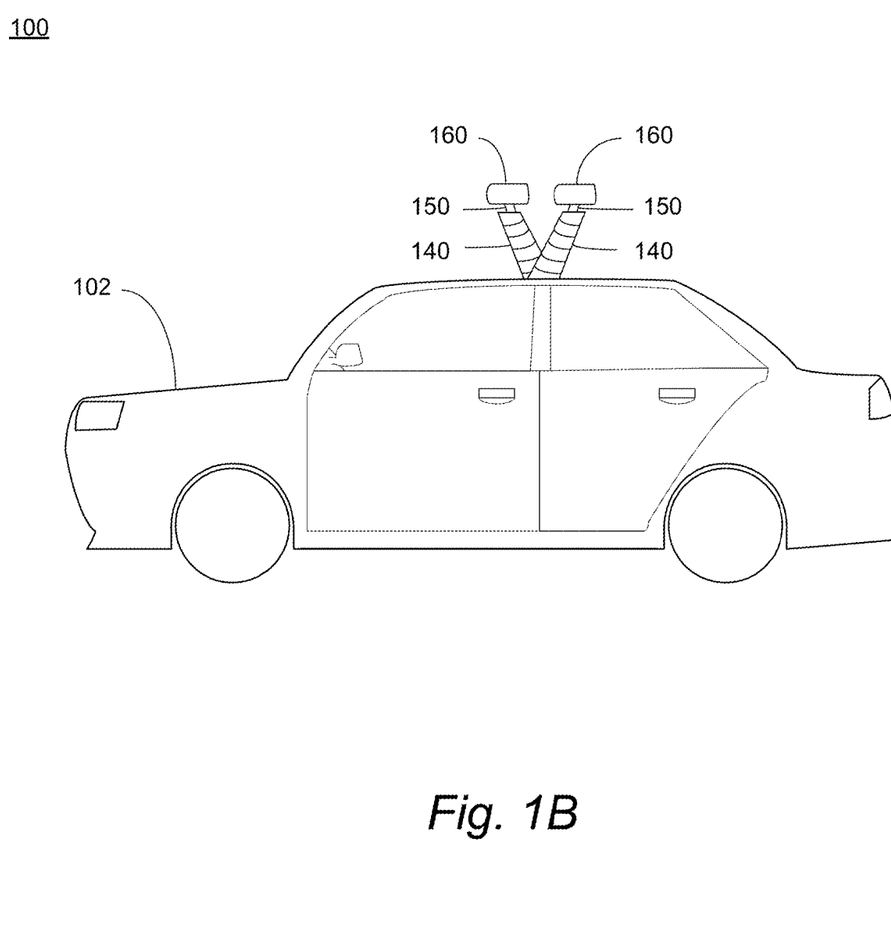
FIG. 1B is a side view of the system for adjusting the position of one or more sensors of an autonomous vehicle according to one or more aspects of the disclosure subject matter.

FIG. 1B is a side view of the system 100 for adjusting the position of one or more sensors 110 of the autonomous vehicle 102 according to one or more aspects of the disclosure subject matter. The system 100 can include a plurality of sensor arms 140, each sensor arm 140 with a corresponding sensor manipulator 150, and each sensor manipulator 150 having a corresponding sensor section 160 attached. Preferably, the system 100 includes two sensor arms 140, a sensor manipulator 150 attached to each sensor arm 140, and a sensor section 160 attached to each sensor manipulator 150. Additionally, the sensor arms 140 can be positioned anywhere on the autonomous vehicle 102, such as at a midpoint of the roof of the autonomous vehicle 102, on the hood, front or rear bumper, and the like. The midpoint of the roof, for example, allows for an elevated position as well as coverage down the sides of the autonomous vehicle 102. In another aspect, the sensor arms 140 can be attached to the front or the back of the roof of the autonomous vehicle 102.

Figure 1C:
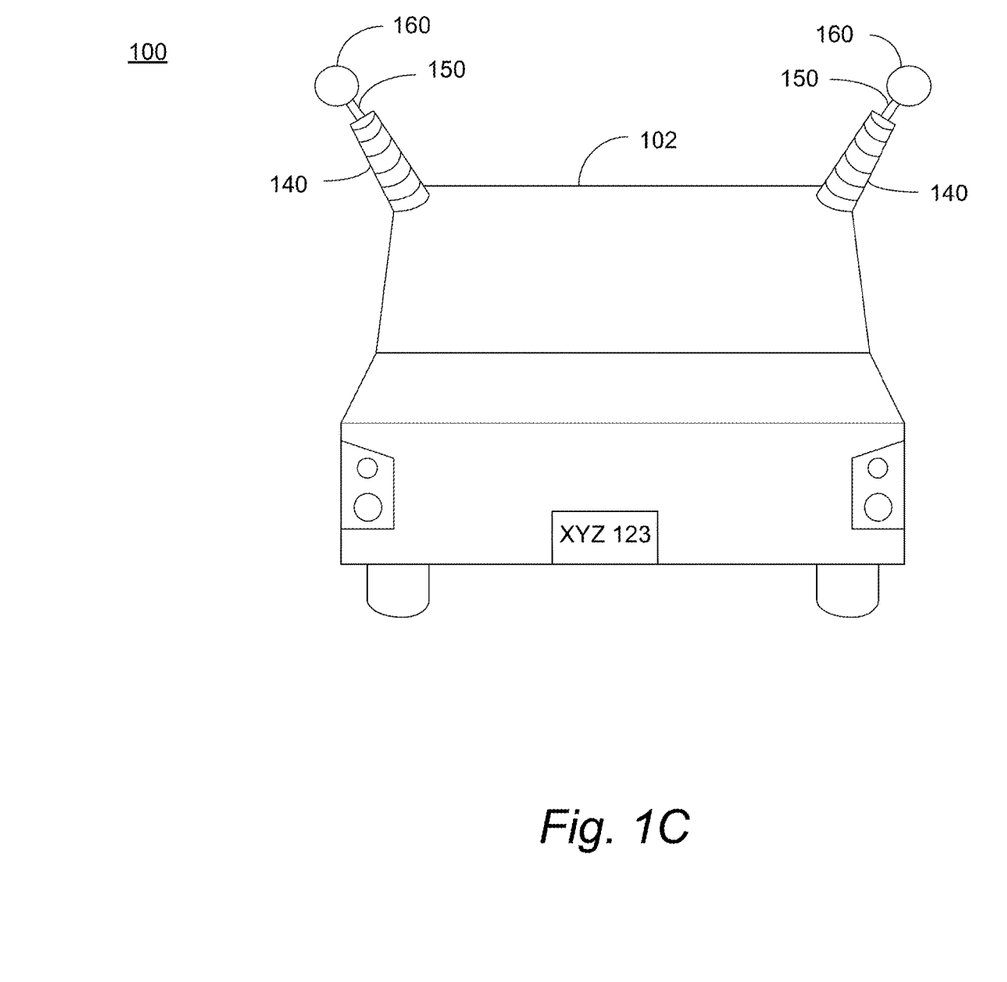
FIG. 1C is a perspective view of the system for adjusting the position of one or more sensors of an autonomous vehicle according to one or more embodiments of the disclosed subject matter.

FIG. 1C is a perspective view of the system 100 for adjusting the position of one or more sensors 110 of an autonomous vehicle 102 according to one or more embodiments of the disclosed subject matter. In one aspect, the sensor arms 140 can be attached to a left side the autonomous vehicle 102 and a right side of the autonomous vehicle 102, respectively, thereby improving visibility down the sides of the autonomous vehicle 102, as well as providing a wide stereo baseline to increase the range of the sensors 110.

Figure 2:
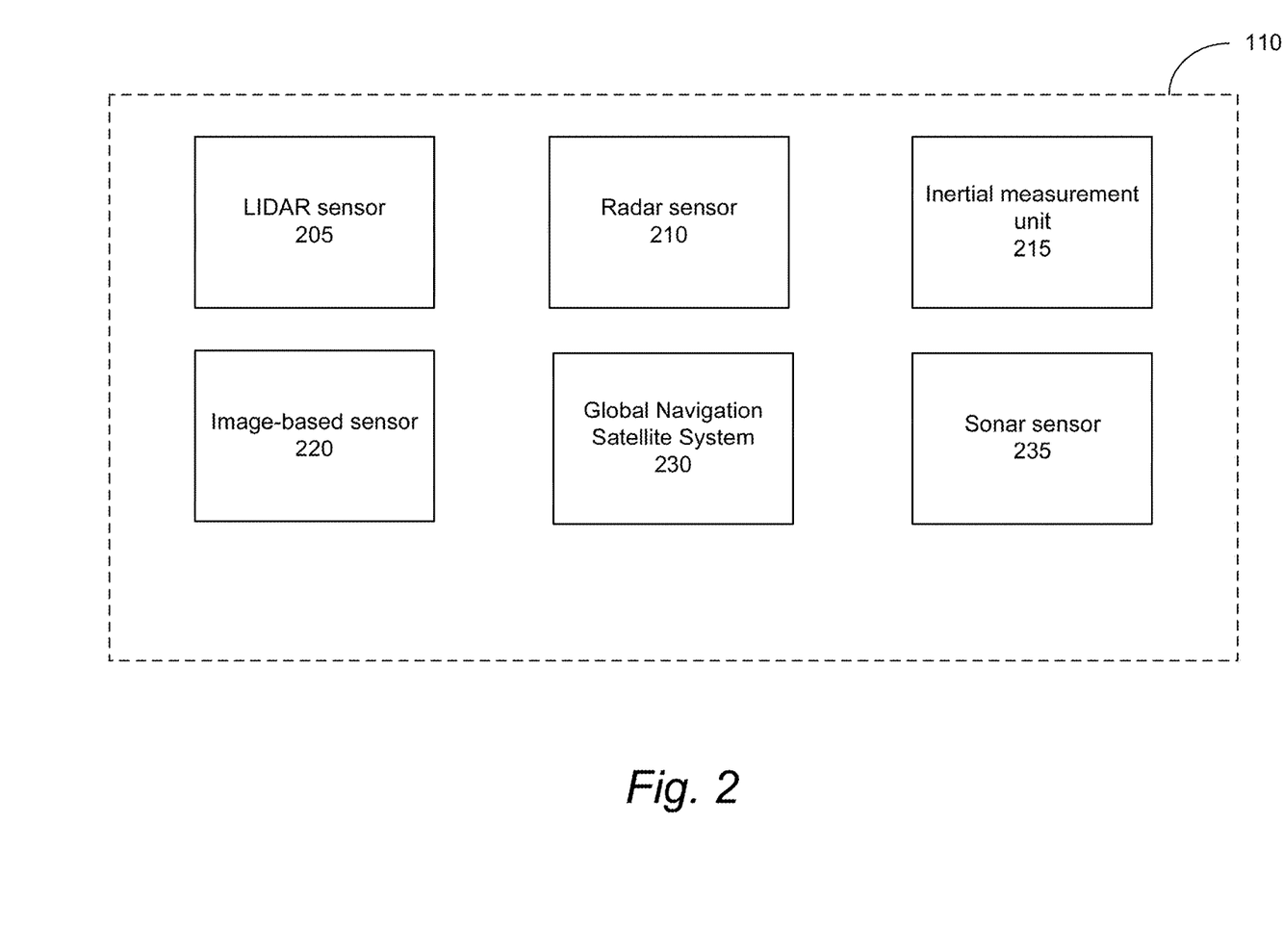
FIG. 2 is a block diagram of sensors for the autonomous vehicle according to one or more embodiments of the disclosed subject matter.

FIG. 2 is a block diagram of sensors 110 for the autonomous vehicle 102 according to one or more embodiments of the disclosed subject matter. The sensors 110 include one or more of a LIDAR sensor 205, a Radar sensor 210, an inertial measurement unit 215, an image-based sensor 220, a Global Navigation Satellite System (GNSS) receiver 230, and a Sonar sensor 235. A LIDAR sensor 205 is a light detection and ranging sensor that measures distance by illuminating a target with a laser. A Radar sensor 210 is a sensor for object-detection that uses radio waves to determine the range, angle, and/or velocity of objects. An inertial measurement unit 215 measures an object's force and angular rate using a combination of accelerometers and gyroscopes, as would be known by one of ordinary skill in the art. The image-based sensor 220 can be one or more cameras. The GNSS 230 can be used for navigation of the autonomous vehicle 102. The Sonar sensor uses sound to navigate and detect other objects. Sensors 110 can also include any other sensors able to assist in safely and efficiently operating the autonomous vehicle 102 by improving the detection of the area surrounding the vehicle and/or improving the localization of the autonomous vehicle 102, for example.

Figure 3:
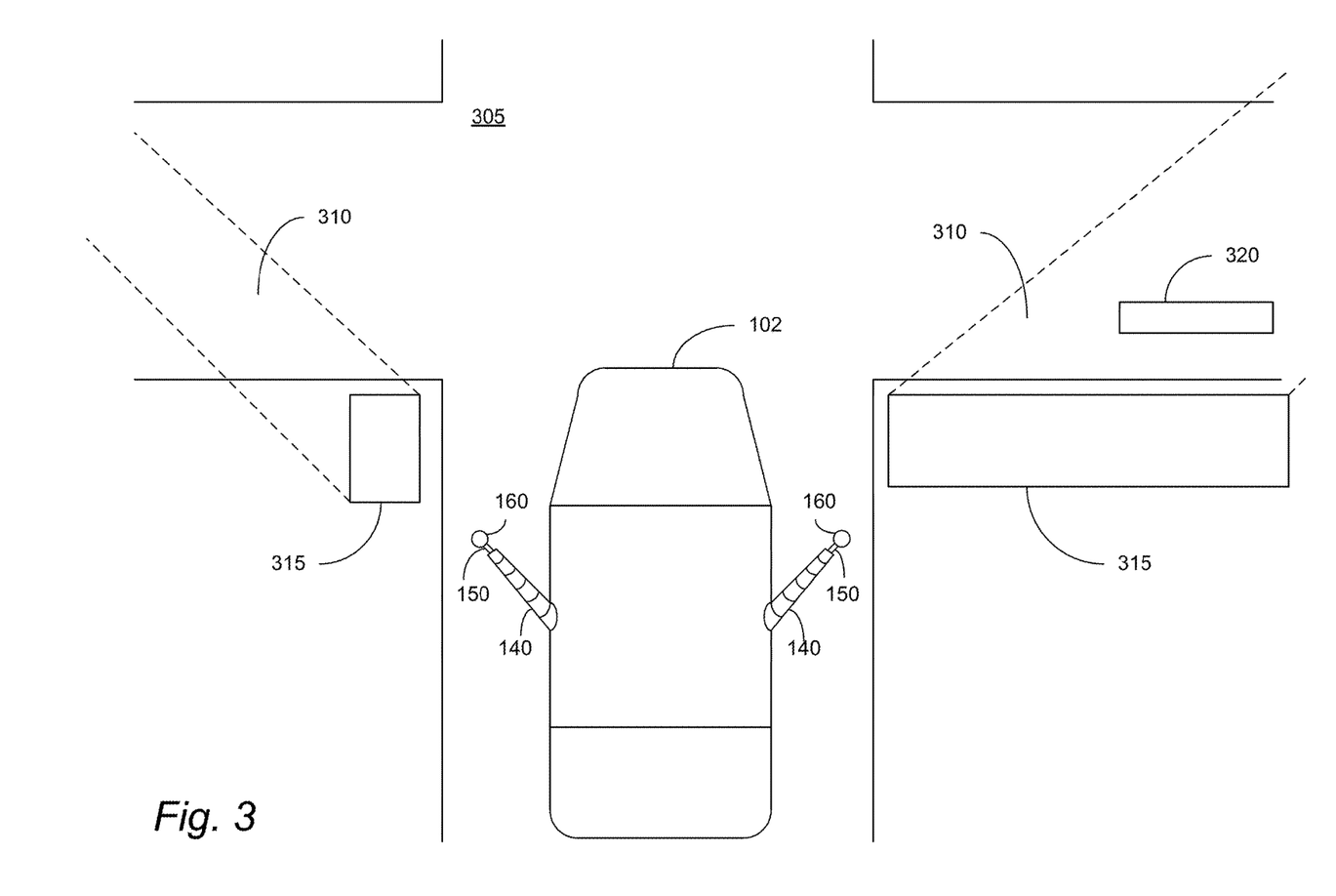
FIG. 3 is a perspective view of the autonomous vehicle approaching an intersection according to one or more aspects of the disclosed subject matter.

FIG. 3 is a perspective view of the autonomous vehicle 102 approaching an intersection 305 according to one or more aspects of the disclosed subject matter. As the autonomous vehicle 102 approaches the intersection 305, the sensors 110 (via sensor section 160) may have limited visibility. Occlusion objects 315 can block the visibility of the sensors 110 creating occlusion zones 310. The occlusion zones 310 can be any occluded area within the maximum range of the sensors 110, the maximum range including any extension provided by the sensor arms 140 and the sensor manipulators 150. The occlusion objects 315 creating the occlusion zones 310 can be any object(s) limiting the visibility of the sensors 110 such as a mailbox, hedges, vehicles parked on the street, buildings, vehicles being driven on the road, and the like. The occlusion zones 310 can be areas that have limited or no visibility for sensors 110. Because of the limited visibility, cyclist 320 can be in the occlusion zone and not detected by the sensors 110. Cyclist 320 can be any object, pedestrian, vehicle, animal, etc. When approaching the intersection 305, the sensors 110 can detect the occlusion zones 310. In response to the detection, the processing circuitry 130 can cause the sensor arms 140 and/or sensor manipulators 150 to adjust the position of the corresponding sensor sections 160 allowing the sensors 110 to reduce the size of the occlusion zones 310 and create acceptable visibility for the sensors 110 so the autonomous vehicle 102 can continue to operate safely. For example, the sensor arm 140 could first swivel toward the front of the autonomous vehicle 102, the sensor arm 140 and sensor manipulator 150 could telescopically extend, and the sensor arm 140 and/or sensor manipulator 150 can rotate as needed about the axis of the sensor arm 140 to view around the occlusion objects 315 and reduce or eliminate the occlusion zones 310.

Figure 4:
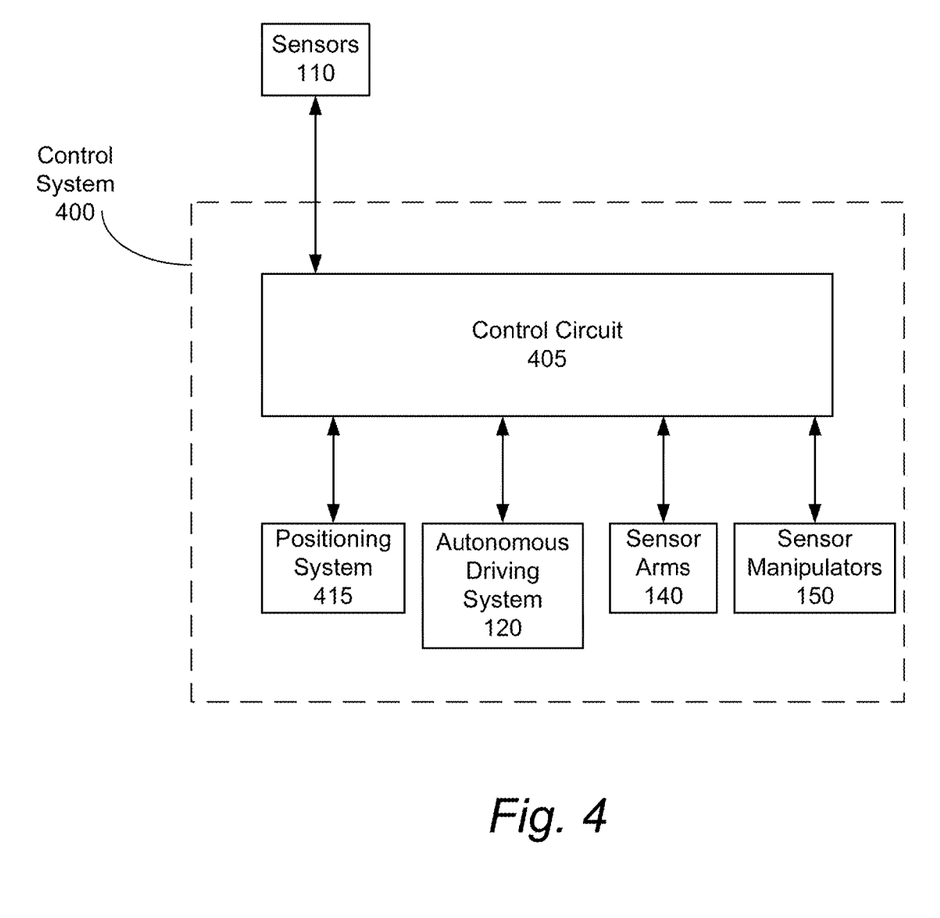
FIG. 4 is a block diagram of an exemplary control system of the system for adjusting the position of one or more sensors of an autonomous vehicle according to one or more embodiments of the disclosed subject matter.

FIG. 4 is a block diagram of an exemplary control system 400 of the system 100 for adjusting the position of one or more sensors 110 of an autonomous vehicle 102 via the sensor section 160 according to one or more embodiments of the disclosed subject matter. FIG. 4 depicts control aspects of control system 400. Optionally, system 400 can represent control aspects of system 100 for FIG. 1A through FIG. 1C.

In FIG. 4, the control system 400 can include a control circuit 405, sensors 110, autonomous driving system 120, sensor arms 140, sensor manipulators 150, and a positioning system 415.

The control circuit 405, which may be representative of processor/processing circuitry 130, can be configured to perform or cause performance of multiple functions, including receiving, monitoring, recording, storing, indexing, processing, and/or communicating data. The control circuit 405 can be integrated as one or more components, including memory, a central processing unit (CPU), Input/Output (I/O) devices or any other components that may be used to run an application. The control circuit 405 can be programmed to execute a set of predetermined instructions. Various instructions including lookup tables, maps, and mathematical equations can be stored in memory, however, it should be appreciated that the storing or reading of such information can be accomplished with alternative types of computer-readable media including hard disks, floppy disks, optical media, CD-ROM, or other forms of RAM or ROM. Additionally, other circuitry including power supply circuitry, signal-conditioning circuitry, solenoid driver circuitry, and communication circuitry can be included in the control circuit 405. Further, it should be appreciated that the control circuit 405 can include multiple controllers wherein each controller is dedicated to perform one or more of the above mentioned functions.

The control circuit 405 can be communicably coupled to the sensors 110. The sensors 110 can provide output signals indicative of parameters relating to the environment and localization of the autonomous vehicle 102 via the system 100. The control circuit 405 can receive signals from each of the sensors 110.

Optionally, the control system can include a positioning system 415 configured to determine the location of the system 100. In an embodiment, the positioning system 415 can be a satellite positioning system such as GPS, which can include the GNSS 230 as a receiver. The control circuit 405 is communicably coupled to the positioning system 415 to continuously or periodically track the location of the system 100. The positioning system 415 can allow for localization of the autonomous vehicle 102 for autonomous operation.

Figure 5:
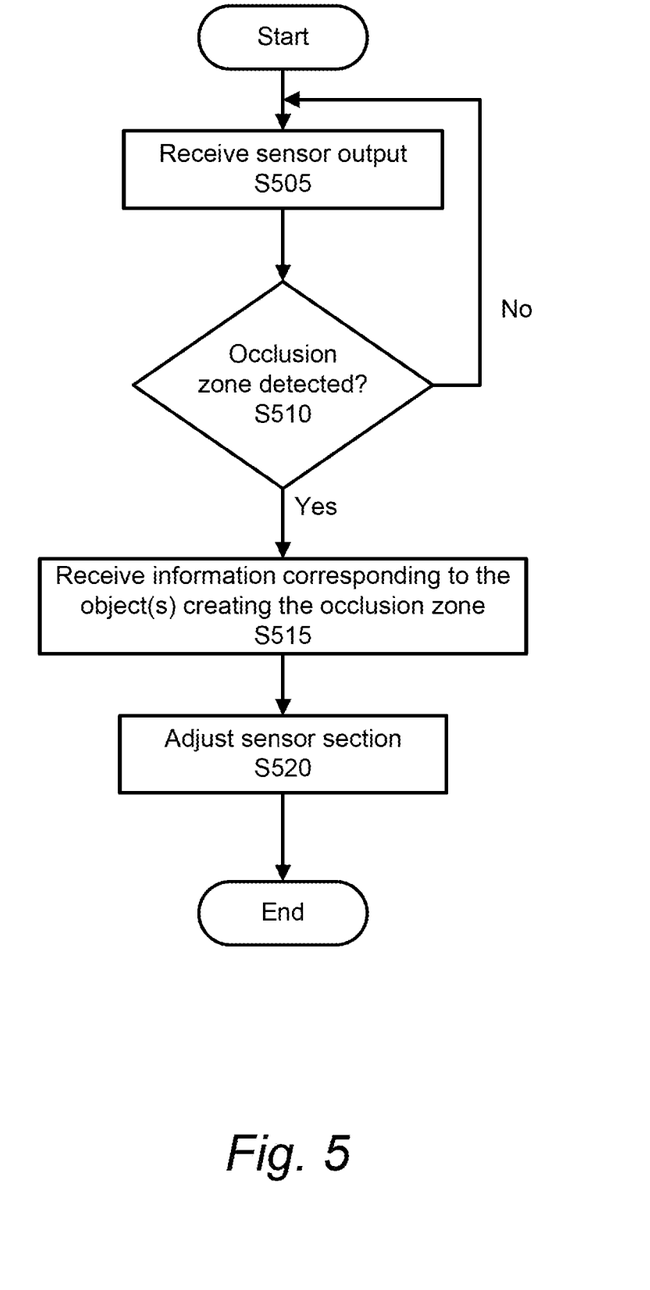
FIG. 5 is a flow chart of a method for adjusting the one or more sensors in response to detecting an occlusion zone.

FIG. 5 is a flow chart of a method for adjusting the one or more sensors 110 in response to detecting an occlusion zone 310.

In S505, output can be received from sensors 110. The processing circuitry 130 can receive data from the sensors 110.

In S510, it can be determined if an occlusion zone 310 is detected. If an occlusion zone 310 is not detected, then the process can return to S510 to determine if an occlusion zone 310 is detected. If an occlusion zone 510 is detected, the information corresponding to the one or more occlusion objects 315 creating the occlusion zone 310 can be received in S515.

In S515, the information corresponding to the one or more occlusion objects 315 creating the one or more occlusion zones 310 can be received by the processing circuitry 130. The information corresponding to the one or more occlusion objects 315 creating the one or more occlusion zones 310 can include a position, height, width, and the like of the one or more occlusion objects 315.

In S520, sensor section 160 can be adjusted in response to the one or more occlusion zones 310 being detected, the adjustment being based on the information corresponding to the one or more occlusion objects 315. For example, the sensor arm 140 can raise the sensor section 160 (and therefore the sensors 110) to a height that will allow the sensors 110 to see the occlusion zone 310 caused by the one or more occlusion objects 315. The height to which the sensor section 160 is raised is based on the height of the occlusion object 315, such that the occlusion object 315 is creating a smaller occlusion zone 310. When the sensor section 160 has been adjusted, the process can end.

Figure 6:
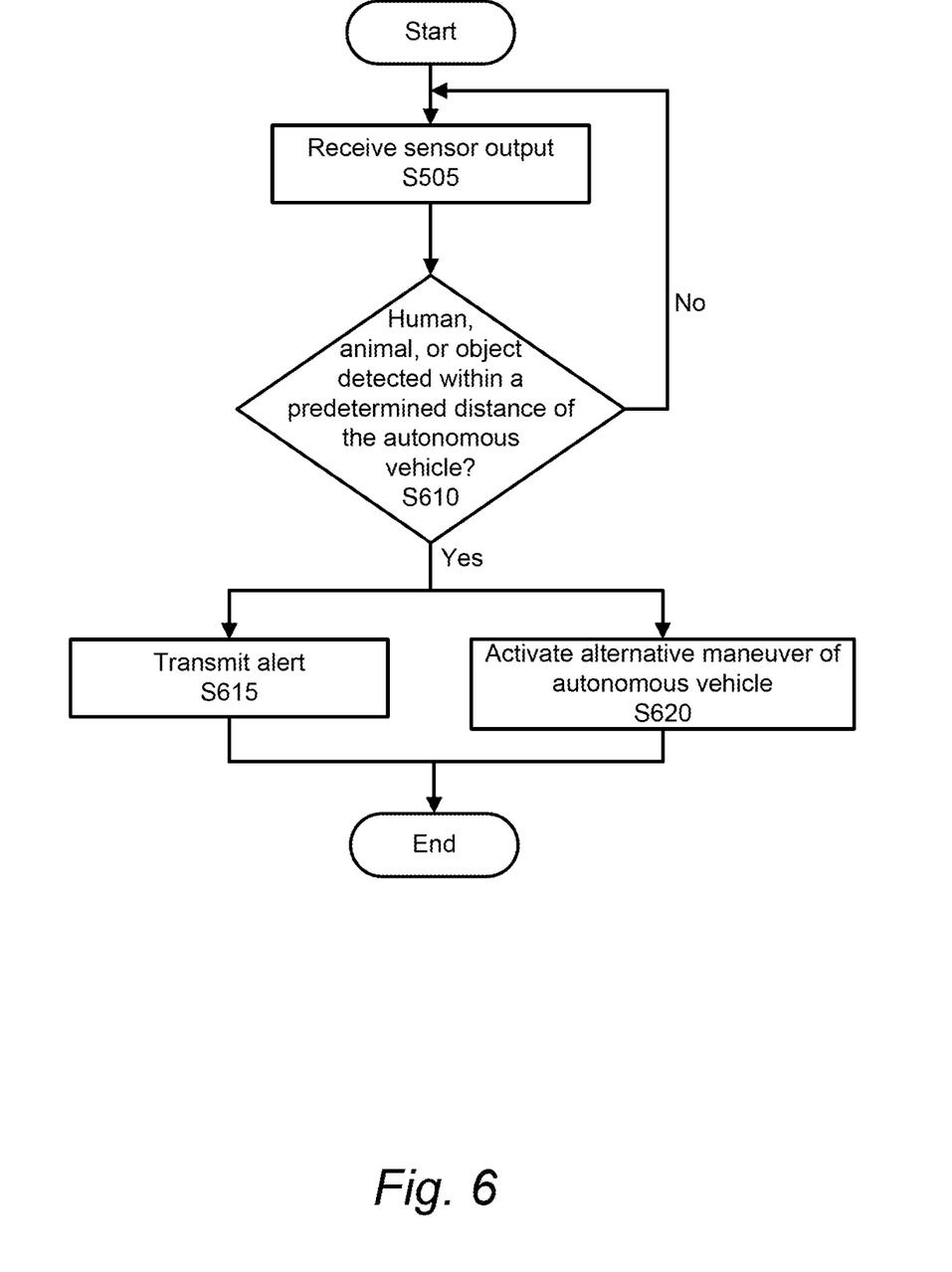
FIG. 6 is a flow chart of a method for determining if a human, animal, or object is within a predetermined distance of the autonomous vehicle.

FIG. 6 is a flow chart of a method for determining if a human, animal, or object is within a predetermined distance of the autonomous vehicle 102.

In FIG. 6, S505 can be the same step as in FIG. 5. The processing circuitry 130 can receive output from the sensors 110.

In S610, it can be determined if a human, animal, or object is detected within a predetermined distance of the autonomous vehicle 102. For example, the predetermined distance can be 6 inches or less. Therefore, any human, animal, or object could be determined to be within the predetermined distance of the autonomous vehicle 102 if the position of the human, animal, or object is detected to be 6 inches or less from the autonomous vehicle 102. Because the system 100 allows for improved visibility down the sides of the autonomous vehicle 102, the predetermined distance can be narrow to prevent unwanted detections in this aspect such as a bicyclist passing the autonomous vehicle 102. If a human, animal, or object is not detected within the predetermined distance of the autonomous vehicle 102, then the process can continue at S610. However, if a human, animal, or object is detected within the predetermined distance of the autonomous vehicle 102, then an alert can be transmitted in S615 and/or an alternative maneuver of the autonomous vehicle 102 can be activated in S620. The object detected can match one of a predetermined set of objects stored in memory previously identified to be an object for which the autonomous vehicle should transmit an alert in S615 and/or perform an alternative maneuver in S620, or the object is unidentified such that the object does not match any object stored in memory, which can also transmit an alert in S615 and/or perform an alternative maneuver in S620.

In S615, an alert can be transmitted when a human, animal, or object is detected within a predetermined distance of the autonomous vehicle 102.

In S620, an alternative maneuver of the autonomous vehicle 102 can be activated in response to a human, animal, or object being detected within a predetermined distance of the autonomous vehicle 102. The alternative maneuver can include slowing and/or stopping the autonomous vehicle 102, swerving, turning, accelerating, any other evasive maneuver, and the like.

It could be considered that S615 and S620 can occur independently, simultaneous, in any order, and the like. Additionally, S615 or S620 can occur alone. For example, an alert may be transmitted in S615, but the processing circuitry 130 can determine that the alternative maneuver of the autonomous vehicle 102 does not need to be activated in S620.

An advantage of the system 100 is a wide stereo baseline which is a result of the sensor arms 140 being positioned so that the sensors 110 are in a position wider than the autonomous vehicle 102. The wide stereo baseline can increase the range of the sensors 110. Having long distance visibility is crucial for autonomous vehicle operation, especially when operating at high speeds, such as on the freeway, for example. Additionally, the wide stereo baseline significantly improves visibility down the sides of the autonomous vehicle 102 which allows for additional safety features including the detection of a human, animal, or object within a predetermined distance of the autonomous vehicle 102. For example, the autonomous vehicle 102 may be parked and a child may have crawled under the autonomous vehicle 102. The sensors 110 can detect that the child is within the predetermined distance and has not yet moved to a position greater than the predetermined distance (e.g., remaining next to or under the car). In response to the detection, the processing circuitry 130 can transmit an alert and/or activate the alternative maneuver of the autonomous vehicle 102 to prevent the autonomous vehicle 102 from moving while the child is under the autonomous vehicle 102.

Another advantage is the flexibility allowed by the range of motion of the sensor arms 140 and sensor manipulators 150. For example, when an occlusion zone 310 is detected, the one or more sensor arms 140 and corresponding sensor manipulators 150 can adjust the position of the sensor section 160 (and therefore the sensors 110) to reduce the size of the occlusion zone 310. This adds significantly to the safety of the operation of the autonomous vehicle 102. For example, when making turns with limited visibility, such as when approaching an intersection with occlusion objects 315 including mailboxes, hedges, cars parked in the street, and the like, the sensors 110 can gain visibility into the occlusion zones 310 before proceeding with operation. Additionally, when approaching a curve in a road that would typically have limited visibility, the sensor arms 140 and/or the corresponding sensor manipulators 150 can be maneuvered to adjust the position of the sensor section 160 (and therefore the sensors 110) to see farther around the curve in the road, thereby decreasing and/or eliminating the occlusion zone 310 caused by the blind turn.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

What is claimed is:

1. A system for adjusting the position of one or more sensors of an autonomous vehicle, comprising:
   a plurality of sensor arms attached to a roof of the autonomous vehicle;
   a plurality of sensor manipulators attached to each of the plurality of sensor arms by a ball and socket connection;
   a plurality of sensor sections, the sensor sections attached to each of the plurality of sensor manipulators; and
   processing circuitry configured to
   receive output from the one or more sensors,
   determine if an occlusion zone is detected,
   receive information corresponding to one or more objects creating the occlusion zone in response to the detection of the occlusion zone,
   adjust a position of the one or more sensors based on the information corresponding to the one or more objects creating the occlusion zone to decrease the size of the occlusion zone, and
   determine whether an object detected in the occlusion zone after the size of the occlusion zone is decreased is a human or animal by matching the object to one or more reference objects stored in a memory.

2. The system for adjusting the position of one or more sensors of the autonomous vehicle of claim 1, wherein the plurality of sensor sections each include the one or more sensors.

3. The system for adjusting the position of one or more sensors of the autonomous vehicle of claim 2, wherein the adjustment of the one or more sensors is via the plurality of sensor arms, the plurality of sensor arms adjusting the position of the corresponding sensor sections, the adjustment including raising, lowering, rotating axially, extending, retracting, and swiveling.

4. The system for adjusting the position of one or more sensors of the autonomous vehicle of claim 2, wherein the adjustment of the one or more sensors is via the plurality of sensor manipulators, the plurality of sensor manipulators adjusting the position of the corresponding sensor sections, the adjustment including raising, lowering, rotating axially, extending, retracting, and swiveling.

5. The system for adjusting the position of one or more sensors of the autonomous vehicle of claim 1, wherein the occlusion zone is within a maximum range of the one or more sensors, the maximum range including any extension of range provided by one or more of the plurality of sensor arms and the plurality of sensor manipulators.

6. The system for adjusting the position of one or more sensors of the autonomous vehicle of claim 1, wherein information corresponding to the one or more objects creating the occlusion zone includes a position, height, and width of the one or more objects.

7. The system for adjusting the position of one or more sensors of the autonomous vehicle of claim 1, wherein the processing circuitry is configured to
   determine if a human, animal, or inanimate object is detected within a predetermined distance of the autonomous vehicle,
   transmit an alert in response to detection of the human, animal, or inanimate object within the predetermined distance of the autonomous vehicle, and
   activate an evasive maneuver of the autonomous vehicle in response to detection of a human, animal, or object within the predetermined distance of the autonomous vehicle.

8. A method of adjusting the position of a plurality of sensors of an autonomous vehicle, comprising:
   receiving output from the plurality of sensors, the plurality of sensors being attached to a plurality of sensor manipulators, the plurality of sensor manipulators being attached to a plurality of sensor arms that are attached to a roof of the autonomous vehicle, each of the plurality of sensor manipulators being attached to a corresponding one of the plurality of sensor arms by a ball and socket connection;
   determining, via processing circuitry, if an occlusion zone is detected;
   receiving information corresponding to one or more objects creating the occlusion zone in response to the detection of the occlusion zone; and
   adjusting a position of the one or more sensors based on the information corresponding to the one or more objects creating the occlusion zone to decrease the size of the occlusion zone, the one or more sensors being attached to sensor manipulators by a ball and socket connection; and
   determining whether an object detected in the occlusion zone after the size of the occlusion zone is decreased is a human or an animal by matching the object to one or more reference objects stored in a memory.

9. The method of claim 8, wherein the occlusion zone is within a maximum range of the one or more sensors, the maximum range including any extension of range provided by one or more of a plurality of sensor arms and the plurality of sensor manipulators.

10. The method of claim 9, wherein the adjustment of the one or more sensors is via the plurality of sensor arms, the plurality of sensor arms adjusting the position of the corresponding sensor sections, the adjustment including raising, lowering, rotating axially, extending, retracting, and swiveling.

11. The method of claim 9, wherein the adjustment of the one or more sensors is via the plurality of sensor manipulators, the plurality of sensor manipulators adjusting the position of the corresponding sensor sections, the adjustment including raising, lowering, rotating axially, extending, retracting, and swiveling.

12. The method of claim 8, wherein information corresponding to the one or more objects creating the occlusion zone includes a position, height, and width of the one or more objects.

13. The method of claim 8, wherein the processing circuitry is configured to
   determine if a human, animal, or inanimate object is detected within a predetermined distance of the autonomous vehicle,
   transmit an alert in response to detection of the human, animal, or inanimate object within the predetermined distance of the autonomous vehicle, and
   activate an alternative maneuver of the autonomous vehicle in response to detection of a human, animal, or object within the predetermined distance of the autonomous vehicle.

* * * * *